UNITED STATES PATENT OFFICE.

THOMAS TWYNAM, OF MOORTOWN, ENGLAND.

PROCESS OF SEPARATING TIN FROM METALS.

SPECIFICATION forming part of Letters Patent No. 703,165, dated June 24, 1902.

Application filed July 12, 1901. Serial No. 68,076. (No specimens.)

*To all whom it may concern:*

Be it known that I, THOMAS TWYNAM, a subject of the King of Great Britain, residing at Moortown, in the county of York, England, have invented certain new and useful Improvements in Processes of Separating Tin from Metals, of which the following is a full and complete specification, such as will enable those skilled in the art to which it appertains to make and use the same.

The object of this invention is to provide a new and improved process of and method for separating tin from tin scraps, cuttings, &c., which process is more particularly adapted for the separation of tin from tin-plate scraps or cuttings.

To such ends my invention consists in substance of submitting tin-plate scraps, cuttings, or other waste from which the tin is to be separated and recovered to the simultaneous action of salt in solution, carbon, and atmospheric air, the carbon being finely divided or in the form of a powder or dust.

To perform my invention and carry out my improved process for recovering tin, I first dissolve chlorid of sodium or common salt in water, so as to make an exceedingly strong solution or brine, and into the brine so formed I stir the finely-divided carbon or carbon powder or dust until the whole becomes a thick pasty mass which is yet of sufficient fluidity to allow of the easy immersion of the tin bearing scraps or cuttings. Into this carbon and salt bath the cuttings, scraps, &c., are dipped and allowed to remain therein for the period of about one minute and are then withdrawn, when a film of carbon powder or dust will be found adhering to the surface thereof, and if this film be allowed to remain thereon for a certain time the metallic tin will be converted into tin oxid and can in connection with the carbon dust or powder be easily removed by washing the scraps or cuttings in water and then separating the tin therefrom, as hereinafter described. I prefer, however, on the removal of the scraps or cuttings from the bath to cover the surfaces thereof with a very fine dry coating of carbon dust or powder, either by sifting the same over the wet material or by plunging the said material into the carbon-dust and then withdrawing the material as soon as the carbon-dust has fairly adhered. In either case the cuttings, scraps, &c., are allowed to remain exposed for about an hour and are then plunged in water contained in a suitable tank or vessel and well agitated therein. When this is done, the carbon-dust and tin oxid will leave the surface of the iron, which will be found to be completely stripped of the tin, which tin will be found suspended in the water in the form of white oxid of tin, and after allowing sufficient time for the settling of the larger portion of the carbon dust to the bottom of the tank the tin oxid may be siphoned into another vessel or tank and the tin separated from the water by decantation, filtration, or in any other suitable manner, and the resultant product is then dried and smelted or otherwise treated to secure the tin in the metallic or other desired form.

While I prefer to perform my process in the manner above set forth, the same may be varied in several ways. For instance, the cuttings may be dipped bodily into a mass of fine coke dust or powder, well moistened in a solution of salt and water and allowed to remain therein until stripped, after which the tin oxid may be separated from the iron by well agitating the entire mass in water, allowing the coke dust or powder to settle, and then drawing off or removing the tin oxid, as hereinbefore described, or by another modification of such process the cuttings or scraps may be placed in a strong brine in which a quantity of finely-divided carbon has been placed and pressure exerted upon the mass so formed, so as to bring the surfaces of the particles of coke and the cuttings or scraps into close contact; but in said latter case the operation of separation will be much slower than when the carbon is in the form of the dust or powder.

Having thus fully described my invention, what I claim as new, and desire to secure by Letters Patent, is—

1. The herein-described process for separating tin from tin scrap, cuttings, &c., which consists in bringing the scrap, cuttings, &c., into contact with finely-divided carbon in presence of a strong solution of chlorid of sodium, substantially as shown and described.

2. The hereinbefore-described process of separating tin from tin scrap, cuttings, &c., which consists in forming a strong solution of chlorid of sodium, mingling a quantity of carbon-dust therein, so as to thicken the solution, dipping the scrap or cuttings therein, exposing the same to the air, and removing the coke therefrom by washing.

3. The herein-described process of separating tin from tin scrap, cuttings, &c., which consists in forming a strong solution of salt in water, mingling a quantity of carbon-dust with such solution to thicken the same, dipping the scrap, cuttings, &c., therein, withdrawing the same therefrom, dusting the scrap or cuttings so coated with the solution with an additional quantity of fine, pulverized dry carbon, submitting the same to the action of the atmosphere, removing the carbon-dust and tin from the scrap, or cuttings by agitating the same in water, and separating or recovering the suspended oxid of tin.

In testimony that I claim the foregoing as my invention I have signed my name, in presence of the subscribing witnesses, this 3d day of July, 1901.

THOMAS TWYNAM.

Witnesses:
BENJAMIN TALBOT,
CHARLES ALDERTON.